UNITED STATES PATENT OFFICE.

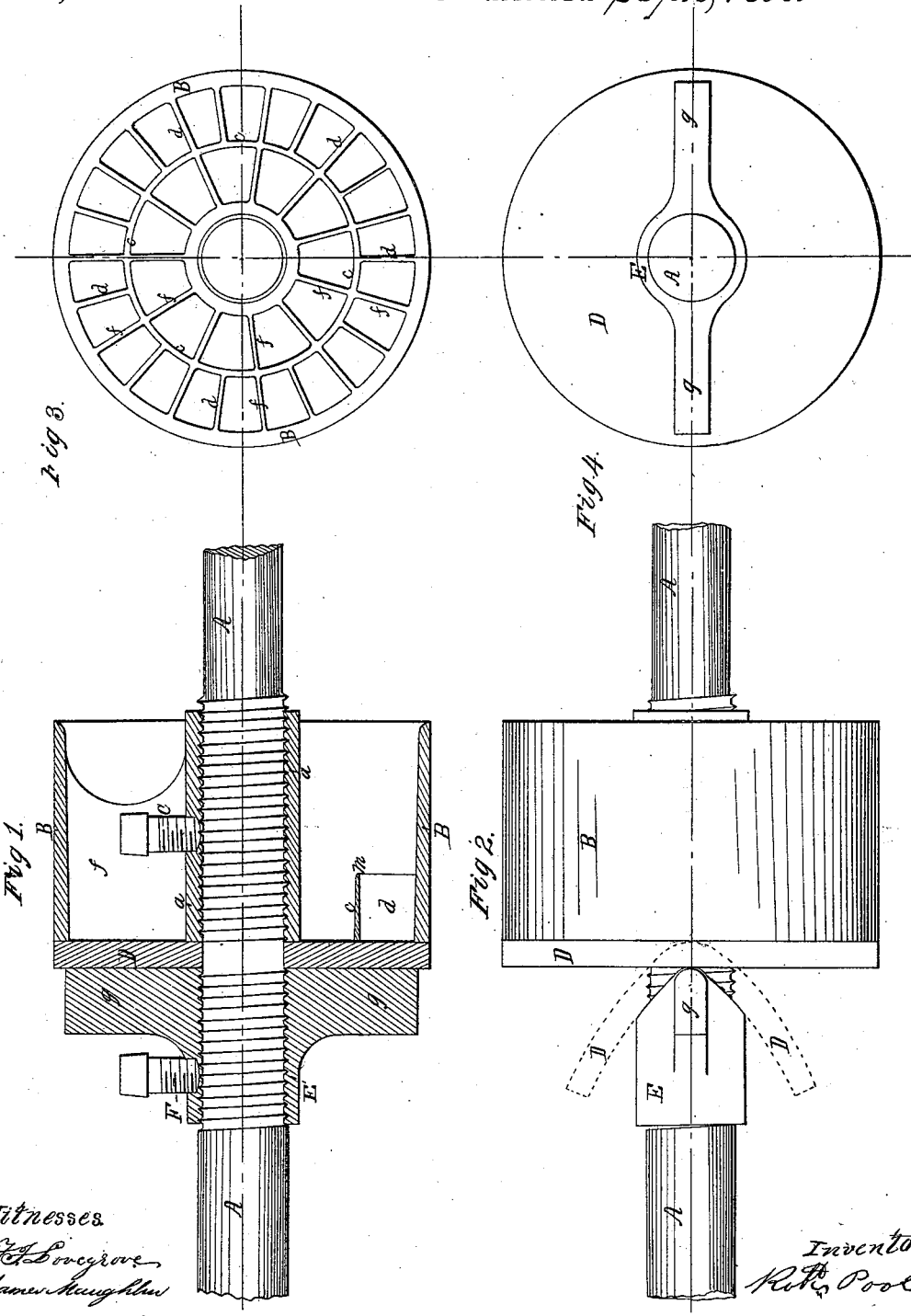

ROBERT POOLE, OF BALTIMORE, MARYLAND, ASSIGNOR TO HIMSELF AND GERMAN H. HUNT, OF SAME PLACE.

PISTON OF PUMPS.

Specification of Letters Patent No. 25,367, dated September 6, 1859.

*To all whom it may concern:*

Be it known that I, ROBERT POOLE, of Baltimore, in the State of Maryland, have invented certain new and useful Improvements in Pistons for Pumps and other Hydraulic Machines; and I do hereby declare that the following is a full, clear, and exact description of the construction and operation of the same, reference being had to the accompanying drawings, in which—

Figure 1, represents a longitudinal vertical section through said pump piston. Fig. 2, represents a side view of the same. Fig. 3, represents an end view of the piston. Fig. 4, represents an end view of the valve.

Where flexible valves, such as are made of india rubber are used for pump pistons they must rest on proportionately large seats, and consequently the water spaces are reduced to an area which is small in proportion to the diameter of the cylinder to prevent such a flexible valve from being pressed into the water spaces.

The nature of my invention relates to the construction of a piston with a flexible valve which is arranged in such a manner that it can easily be secured to and removed from said piston, and wherein the area of the water spaces is comparatively large in proportion to the diameter of the piston, and wherein the valve is opened to such an extent by the pressure of the water as to permit a proportionately large volume of water to pass through the water spaces.

To enable others skilled in the art to make and use my invention, I will proceed to describe its construction and operation.

A represents the piston rod, which has a screw thread cut on its circumference.

B, is the piston or plunger, it consists of a hub *a*, which is screwed on to the piston rod, or which may be secured thereto by means of set screws C, and of the rim B, which hub and rim are connected together by a system of open work or arms, or ribs, such as represented in an end view in Fig. 3; this system consists of the arms *f*, the shape of which is shown in Fig. 1, which extend from the hub *a*, to the rim B; it further consists of a circular rib *c*, and of the ribs *d*, connecting the rib *c*, with the piston B, all the openings between the ribs serve as water spaces, and the ends of said ribs are tapered down wedge fashion as shown at *m*, so that they may present as small a surface as possible to the water as it passes through the water spaces.

D represents a disk valve; it consists of a circular piece of india rubber of the size of the piston, having a hole cut in its center by which it is slipped over the piston rod A the screw thread being cut away at that place—the valve D, fits against the flat ends of the ribs *f*, *c*, *d*, which are sufficiently near together to afford a good seat to the valve, and to prevent the latter from being pressed into the water spaces.

E, represents a screw nut which is formed with two flaps or arms *g*, the lower and rounded edge of which presses against the outside of the valve D, and which thus serves as a bearing for said valve when it is opened by the pressure of the water, and thrown in the position shown in dotted lines in Fig. 2. By this position of the valve it will be seen that it is opened to the utmost possible extent as it then is in contact with its seat only in the red center line, and as the width of the ribs of which the piston is composed can be reduced to a very small area, and still afford sufficient bearing for the valve to rest upon, it follows that with this construction of my piston and valve, I enlarge the water space to a great extent beyond those of the pumps of the ordinary description. The valve D can turn freely on the piston rod, and it can easily be removed and replaced by unscrewing the nut E, which latter may also be secured to the piston rod by means of a set screw F. The rounded edges of the arms *g*, on the nut prevent the rubber disk from cutting against it and as the disk is free to turn on the piston rod, its impact surfaces are constantly changing, and thus are not worn out in places. This makes a very cheap and efficient valve, and admits of a piston of quite large area or water way,—inasmuch, as the piston and valve work without jar and noise, when moving with a very high speed, and say, under a pressure of 200 lbs. per square inch, without more than the ordinary wear, makes this piston and valve particularly valuable, in connection with steam fire engines, which require these elements, and for which, it is more especially devised, though applicable to other hydraulic machines.

Having thus full described the nature of my invention, what I claim therein as new and desire to secure by Letters Patent is—

1. A valve made of flexible material, hung loosely upon the piston rod, and having for its bearings the round edged wings of the nut by which it is fastened to the piston, substantially in the manner, and for the purpose herein described.

2. I also claim in combination with a flexible valve and winged screw nut, a piston constructed of ribs, which present sharp edges to the water, while they are flat at the end which constitutes the seat of the flexible valve, substantially in the manner and for the purpose herein described.

ROBT. POOLE.

Witnesses:
F. I. LOVELACE,
JAMES MAUGHLIN.